United States Patent
Nash

[19]

[11] Patent Number: 5,891,315
[45] Date of Patent: Apr. 6, 1999

[54] FILTER SYSTEM FOR REMOVAL OF PARTICLES FROM HYDROCARBONFLUIDS

[75] Inventor: Stanley G. Nash, Merrillville, Ind.

[73] Assignee: Analytic Systems Laboratories, Inc., Merrilville, Ind.

[21] Appl. No.: 863,861

[22] Filed: May 27, 1997

Related U.S. Application Data

[60] Provisional application No. 60/033,242, Dec. 6, 1996.
[51] Int. Cl.[6] .............................. B01D 35/06; B03C 5/02
[52] U.S. Cl. ............................................ 204/664; 204/665
[58] Field of Search ................................... 204/557, 562, 204/572, 664, 665, 672, 673; 210/222, 223, 243, 748

[56] References Cited

U.S. PATENT DOCUMENTS

| | | | |
|---|---|---|---|
| 3,729,402 | 4/1973 | Griswold | 204/664 |
| 4,238,326 | 12/1980 | Wolf | 210/695 |
| 4,350,590 | 9/1982 | Robinson | 210/243 |
| 4,594,138 | 6/1986 | Thompson | 204/665 |
| 4,800,011 | 1/1989 | Abbott et al. | 204/665 |
| 5,149,422 | 9/1992 | Barrington | 210/85 |
| 5,242,587 | 9/1993 | Barrington | 210/223 |
| 5,332,485 | 7/1994 | Thompson | 204/665 |
| 5,352,347 | 10/1994 | Reichert | 204/665 |
| 5,571,399 | 11/1996 | Allen | 204/665 |

OTHER PUBLICATIONS

Technical Product Function Sheet, Filtering Functions, Filtration, Demisting, Humidification, Separation, 6 pages*.

Primary Examiner—Kathryn Gorgos
Assistant Examiner—William T. Leader
Attorney, Agent, or Firm—Laff, Whitesel, Conte & Saret, Ltd.

[57] ABSTRACT

An electrostatic filter removes particles from non-electrically-conductive fluids. A pair of electrical conductors extend through a filter housing for providing one of a plurality of D.C. voltage levels selected to control electrical current consumption within the filter. A plurality of identical perforated, electrically conductive plates are connected to individual ones of the conductors by reversing the orientation of the plate. Successive plates are alternately positive or negative. Porous foam filter pads are located between each pair of plates. A permanent magnet is located in the foam pads which are between the positive to negative, but not between negative to positive, conductive plates, determined with respect to the direction of the fluid flow within the filter housing. The permanent magnetic field interacts with a corona formed around plates of one polarity in order to agitate the particles which then become entrapped within the porous foam filter pads.

14 Claims, 7 Drawing Sheets

FILTER SYSTEM FOR REMOVAL OF PARTICLES FROM HYDROCARBONFLUIDS

This is a formal application which replaces a provisional application Ser. No. 60/033,242, filed Dec. 6, 1996.

BACKGROUND OF THE INVENTION

The invention relates to electrostatic systems for rejuvenating contaminated fluids by removing particles therefrom and more particularly to small systems for so removing particles.

Reference is made to U.S. Pat. Nos. 5,149,422 and 5,242,587 which shown a superior filter system of the described types. However, the system described in those patents is adapted to process fluid in a reservoir having a capacity in the range of 100–2000 gallons. The cost, servicing, and maintenance requirements are in scale with the size of these large systems. Technically, these patented systems are not limited on the lower end to this particular large volume, but they are not completely practical for use as small systems adapted to process fluid in, say, a 10–40 gallon reservoir, for example. The reasons for the large/small scale differences are many such as a need for the mechanical construction to contain large volumes, the manner of assembling, the size of the required power source, and the like. Another and somewhat similar large system is shown and described in U.S. Pat. No. 5,556,522.

Accordingly, merely scaling down a large system, such as described in the above-identified patents, is not an answer to the small system needs. Rather, for a small system, there should be a way of using injection molded plastic parts, assembling at lower cost, replacing parts without having to disassemble and reassemble everything in the system, shipping filters back to a factory or a service center, and the like.

SUMMARY OF THE INVENTION

In keeping with an aspect of the invention, the filter is enclosed in a housing having two injection molded parts which slide together. Then, they are held locked to each other by a few simple screws. One part of the housing contains the electrical power source for the system. The other part of the housing contains a filter stack formed by a plurality of electrostatic plates of alternate polarity separated from each other by pads of plastic foam. The plates are perforated with enough open area to facilitate the flow of fluid through them. The foam has "straws" which are microscopic pores extending directly through the foam, again, with enough open area for fluid to flow therethrough. Hence, the fluid to be processed may pass through the perforations in the plates and the "straws" in the plastic foam.

The Technical Products Group of 1500 East Second Street, Eddystone, Pa. 19022 has engineered a high performance foam, such as that sold under the trademark "Foamex". This foam material can be described as: A fully-reticulated flexible polyester urethane foam with a three-dimensional structure of skeletal strands, yielding an exceptionally porous and permeable material where each cell in the medium is completely interconnected with all surrounding cells.

Alternate ones of the plates are coupled to a positive pole of a D.C. power source. The rest of the plates are coupled to the negative pole of the power source. Each plate has an arm on one side which may make an electrical connection simply by sliding the plate into the stack. Accordingly, the selection between a positive or a negative electrostatic charge is made by the simple expedient of turning over the electrostatic plate.

Every other pad of foam contains permanent magnets. These magnets are in the foam pads between the positive to negative plates, taken relative to the direction of fluid flow. There are no magnets in the foam pads between the negative to positive plates, again taken relative to fluid flow direction.

Since metal pipes, couplings, etc. run from the filter housing and into public areas, it is important for the negative plates to be at earth ground.

BRIEF DESCRIPTION OF THE DRAWINGS

A preferred embodiment of the invention may be understood from the following description taken with the attached drawing, in which.

DETAILED DESCRIPTION OF THE INVENTION

The filter housing 20 has two parts 22, 24, each of which is an injection molded part. Filter part 22 contains a filter stack formed by a plurality of spaced parallel electrostatic plates separated from each other by foam pads. The housing part 24 contains an electrical power supply which may selectively deliver any one of a plurality of D.C. voltages, here: 5,000; 10,000; 15,000 volts, by way of example.

Figure 1:
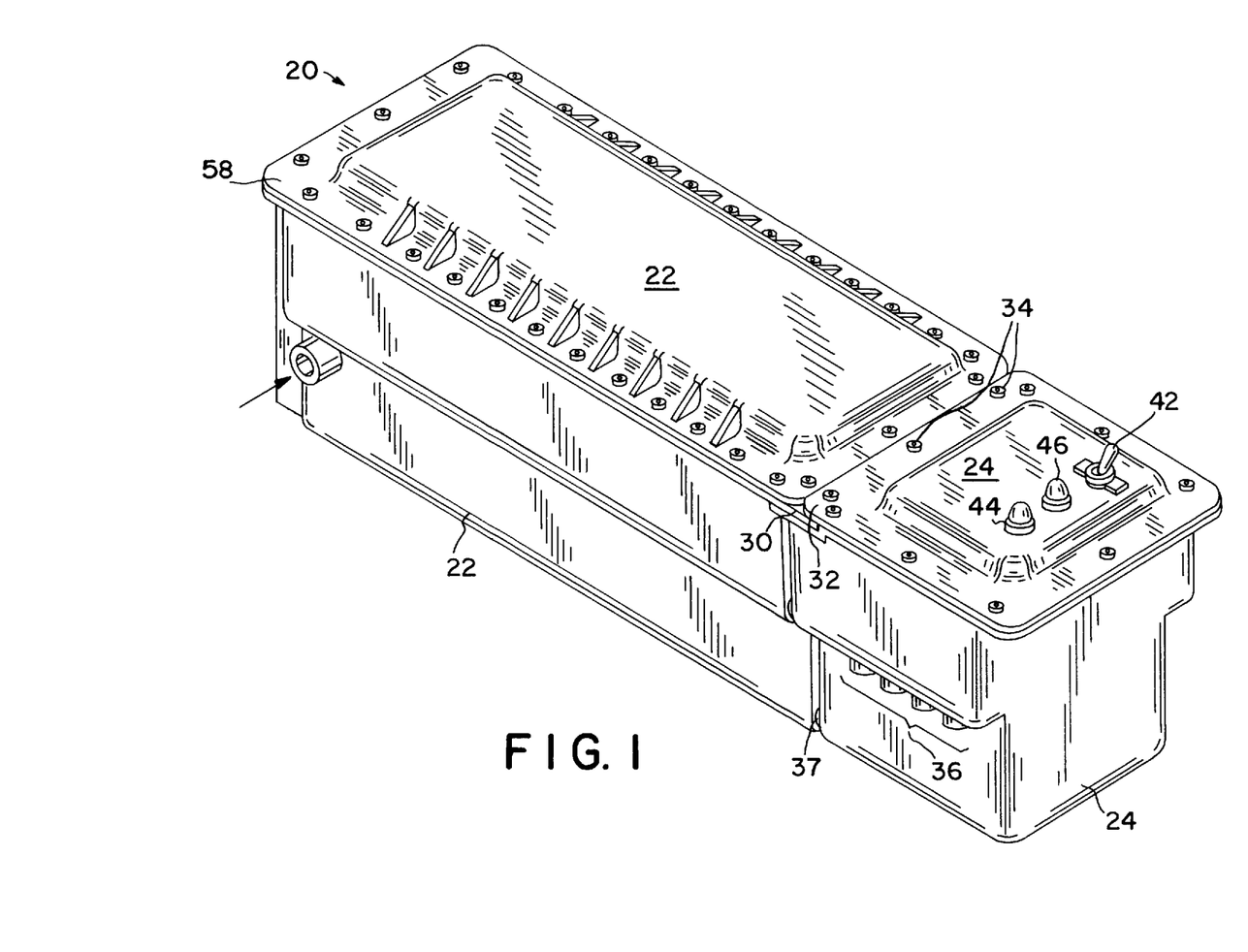
FIG. 1 is a perspective view of a fully assembled two part housing for the inventive filter.
Figure 1A:
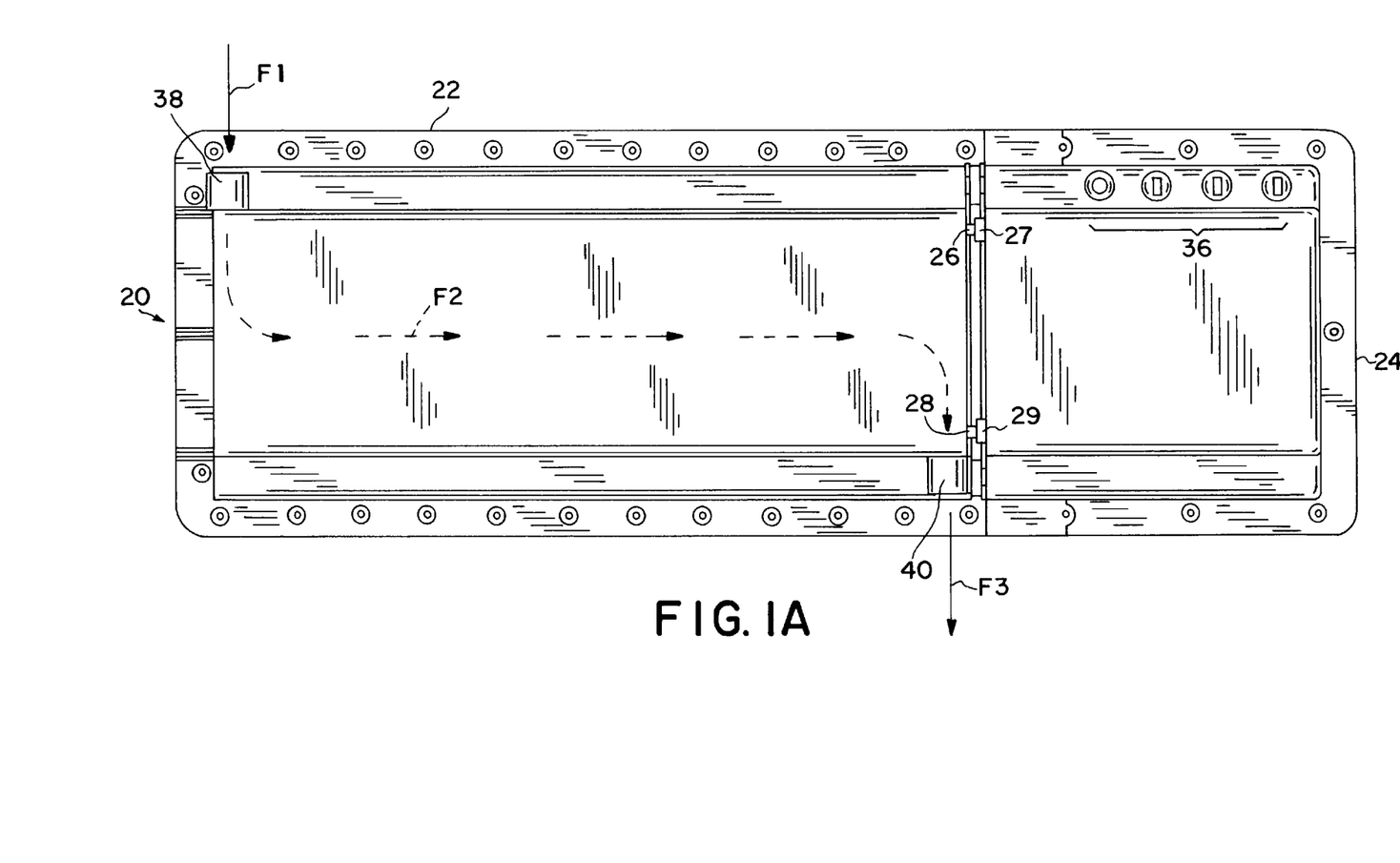
FIG. 1A is a bottom plan view showing a path for the fluid being processed to flow through the housing.

The two parts 22, 24 are electrically connected by two bars 26, 28 (FIGS. 1, 2, 3) which extend through the length of filter housing part 22 and fit into jacks 27, 29 in the electrical housing part 24. Mechanically, the two housing parts are connected by a flange 30 extending from filter housing part 22 and fitting under a lid 32 of the electrical housing part. Screws 34 penetrate both the lid 32 and the flange 30 to complete the mechanical connection. Electrically, the two housing parts are interconnected at bars 26, 28 and jacks 27, 29 (FIG. 1A). The electrical power pack in housing part 24 is connected to an outside source at connectors 36. Two posts 35 (FIG. 2) are molded on the end surface of plastic housing part 22 to fit into two sprockets 37 molded on the corresponding end surface of plastic housing part 24 in order to further strengthen the mechanical connection between the two housing parts.

The connections and path for supplying and removing the fluid are best seen in FIG. 1A. The spent or "dirty" fluid stream F1 enters the housing part 22 at fitting 38, flows through the housing (Arrow F2), and exits as the "cleaned" and rejuvenated stream F3 via fitting 40. During its pass through housing part 22 (indicated by arrow F2), the particles and other foreign matter are removed from the fluid. Almost, any fluid may be so cleaned provided that it is not an electrically conductive fluid since the system depends on effects resulting from electrostatic charges.

The negative potential of the power supply and all negative electrostatic plates are held at earth ground. This is because the electrostatic plates may have as high as 15,000 volts D.C. and the flowing fluid stream might pick up an electrical charge which could be carried out of the filter and onto pipes, fittings, and any other adjacent electrically conductive structure. Obviously, such voltage would be a hazard in a work area.

Figure 2:
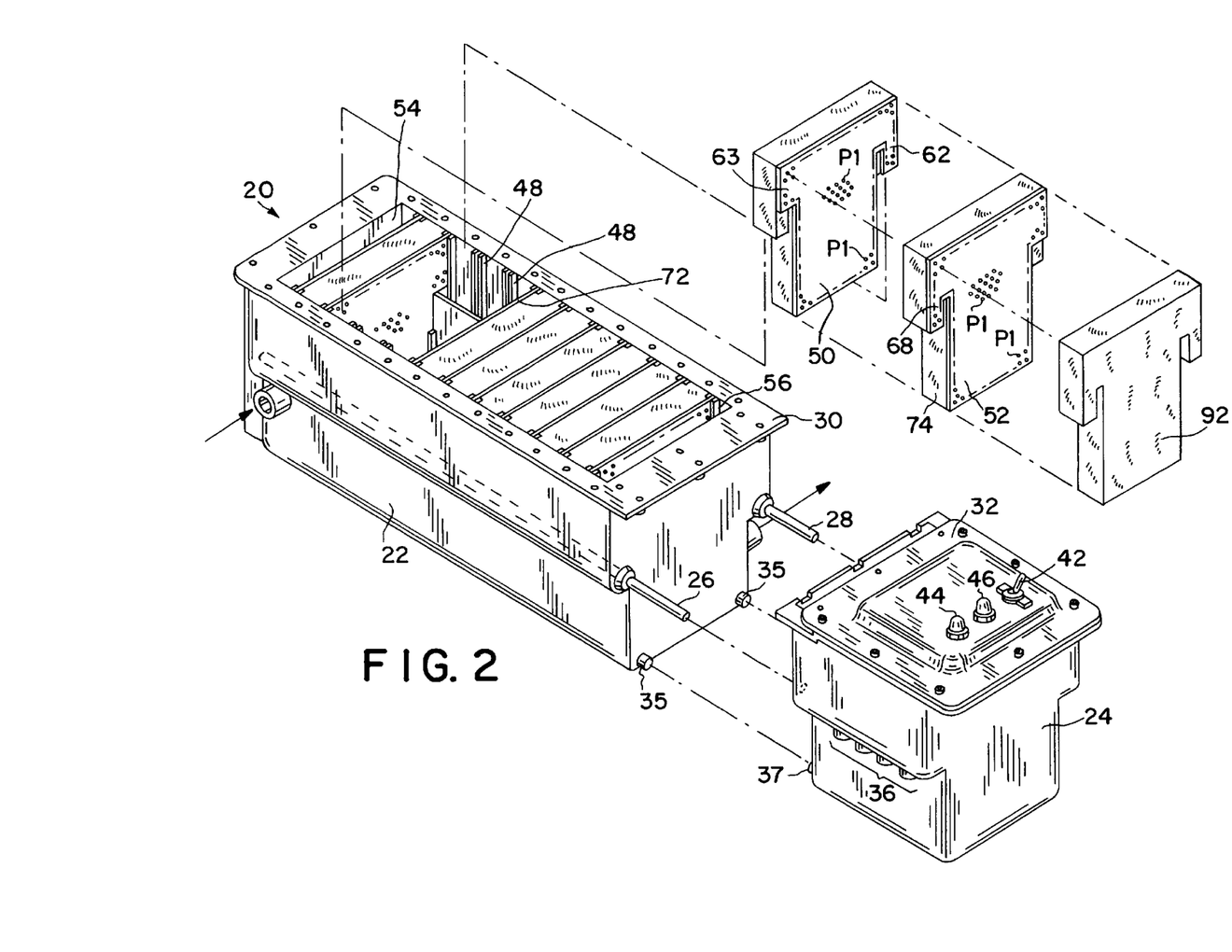
FIG. 2 is a perspective view of the two part housing of FIG. 1, with the electrical power source part separated from the filter part containing a filter stack and with several of said electrostatic plates and a foam pad removed from the filter stack.
Figure 3:
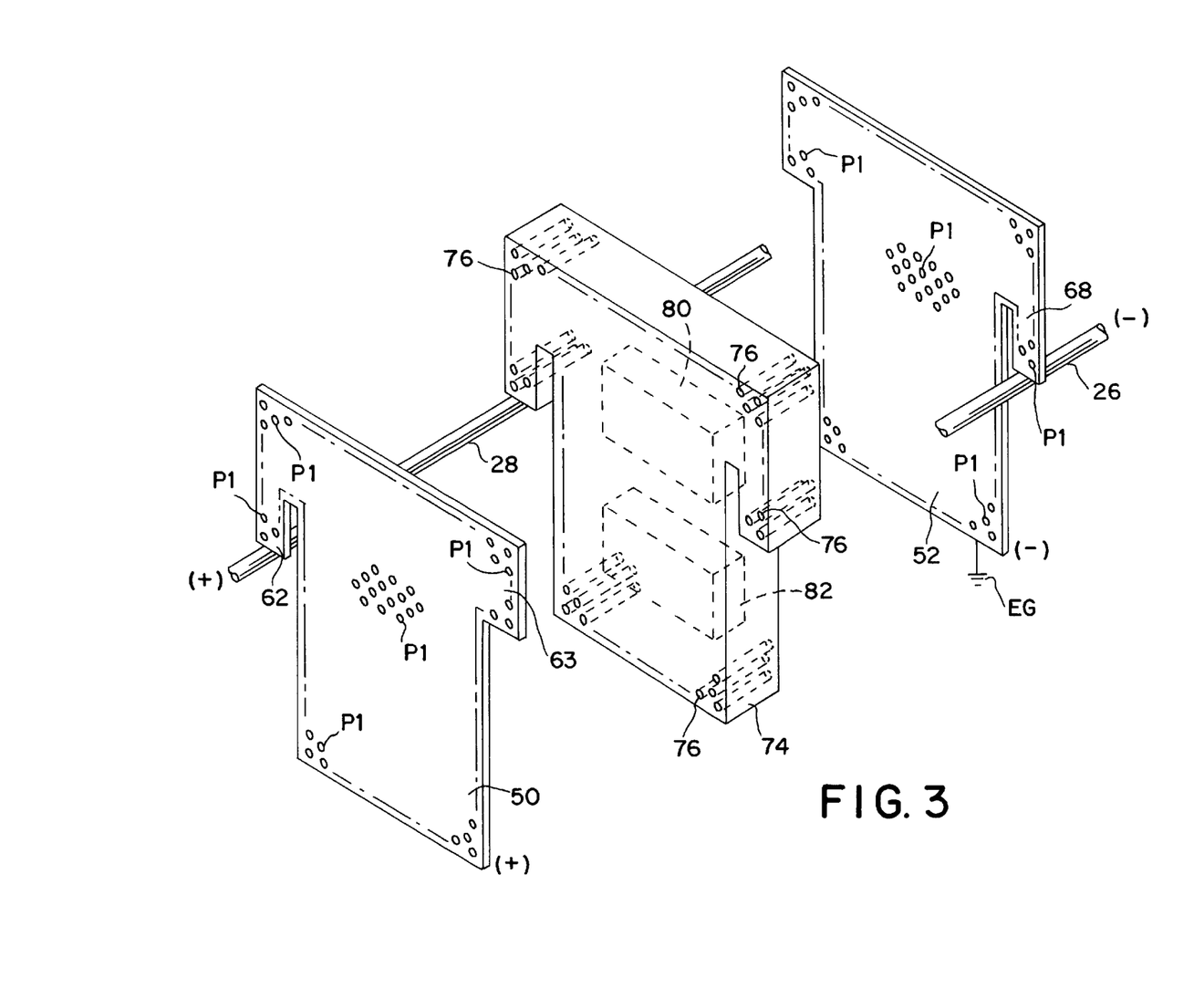
FIG. 3 is an exploded view, in perspective, of two electrostatic plates, a pad of foam, and two electrical conductor bars.
Figure 4:
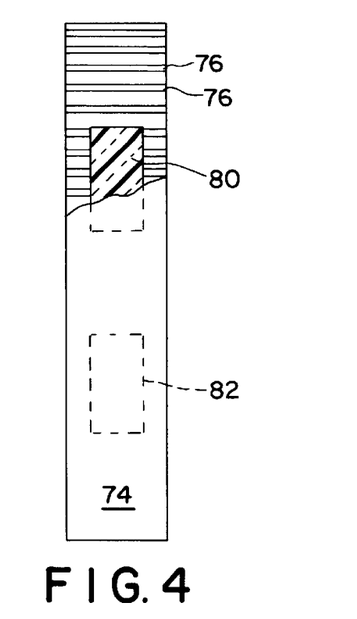
FIG. 4 is a side view of a foam pad, partly broken away to show the microscopic straws and a ceramic magnetic within the foam pad.

The power pack in housing part 24 may produce any convenient and suitable voltage. The present system uses a selected one of 5,000; 10,000; and 15,000 volts D.C., with the selection being made by a choice of the input terminals 36 which are used to connect the filter to a power source such as 110 or 220V commercial power. The power pack in housing part 24 is switched on and off at 42 (FIG. 2). Two pilot lamps 44, 46 give a green or red light, respectively, to indicate go/no go conditions.

An advantage of this modular construction is that either the power supply in housing part 24 or the filter in housing part 22 may be replaced or returned to the manufacturer for maintenance. Also, as the system is improved, either the filter part 22 or the power supply part 24 may be upgraded with a newer design.

The internal construction of the filter housing part is shown in FIG. 2. Inside housing part 22 molded cleats or ribs 48 are formed periodically along the length of the interior housing walls. The dimensions are such that a plurality of perforated electrostatic plates 50, 52 may be inserted into and supported by tracks formed by the ribs 48. These plates are uniformly perforated across their entire surface, (a few of the perforations being shown in the drawings and labeled "P1"). The end spaces 54, 56 are empty to collect water, a similar foreign fluid, or the like, which may be entrained in the fluid being processed.

Two conductive bars 26, 28 extend throughout substantially the full length of the housing part 22 and on into jacks 27, 29 which are energized by the power pack in housing part 24. One of the bars (here 28) is at a positive voltage. The other of the bars (here 26) is at a negative (earth ground) potential. This means that bar 28 is at one of the positive potentials 5,000; 10,000; or 15,000, relative to earth ground.

A single configuration is used for all of the perforated electrostatic plates. As will be observed in FIGS. 2 and 3, plate 50 has an arm 62 on one side but not on the other. Therefore, when plate 50 is installed in the housing by sliding it down the track 48, arm 62 touches and makes firm electrical contact with bar 28 which raises the plate potential to the positive voltage level supplied by the power pack in housing part 24. The opposite side 63 has no arm and does not touch bar 26. Note that plate 52 is turned over as compared to plate 50. Now the arm 68 is on the right so that it makes contact with bar 28. Hence, plate 52 is at a negative earth ground potential, as indicated at EG in FIG. 3.

The next plate 72 (FIG. 2) will be turned, as plate 50 is turned, so that bar 28 is engaged and plate 72 is at the positive potential. In like manner, each plate is turned relative to its neighboring plates so that the sequence of plate potentials is: (−), (+), (−), (+), etc.

The attachment of the top cover 58 (FIG. 1) to housing part 22 will impart enough contact pressure to insure a good electrical connection between the electrostatic plates and the conductive bars 26, 28.

A porous plastic foam pad 74 (FIG. 3) is made of an electrical insulating material and is positioned between plates 50, 52. Likewise, a similar foam pad is positioned between each pair of plates in the housing part 22. Each of these pads is made of a porous material that is uniformly penetrated across its surfaces by micropassageways (called "straws"), such as 76, for example. Collectively, these straws form an open area through the foam which gives a relatively easy passage for the fluid being processed.

Two vertically disposed, preferably ceramic, permanent magnets 80, 82 are buried in the center of the insulating foam pad 74 which is located in a space between positive (+) to negative (−) plates, taken relative to the direction of fluid flow F2 through housing part 22 (i.e. fluid flows through positive plate 50 before it flows through negative plate 52). There are no magnets in any of the other foam pads located between the negative (−) to positive (+) plates, again taken relative to the direction of fluid flow F2.

Figure 5:
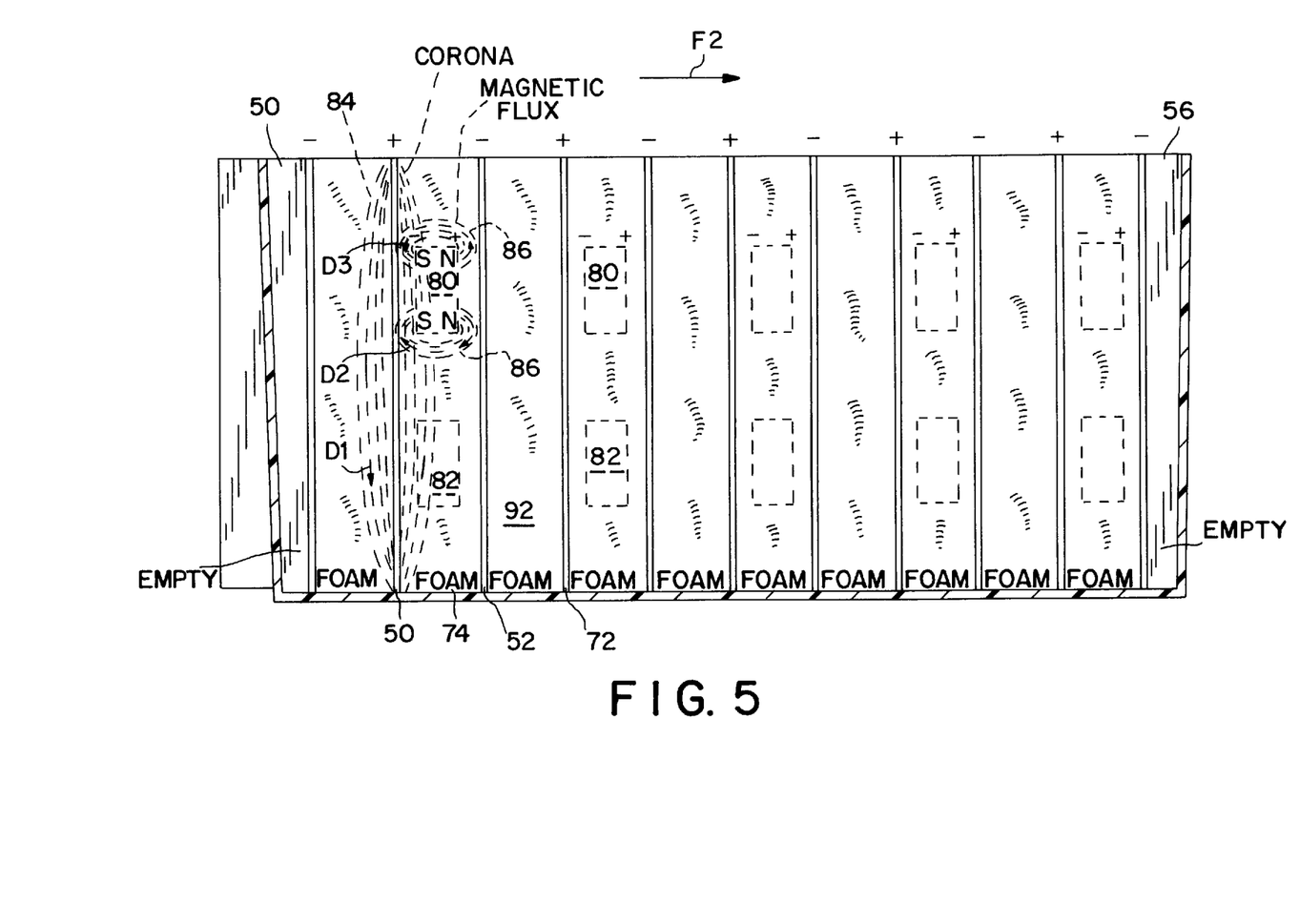
FIG. 5 is a schematic showing a stack of plates and foam pads, and of the electrical and magnetic force field arrangement forming the filter stack.
Figure 6:
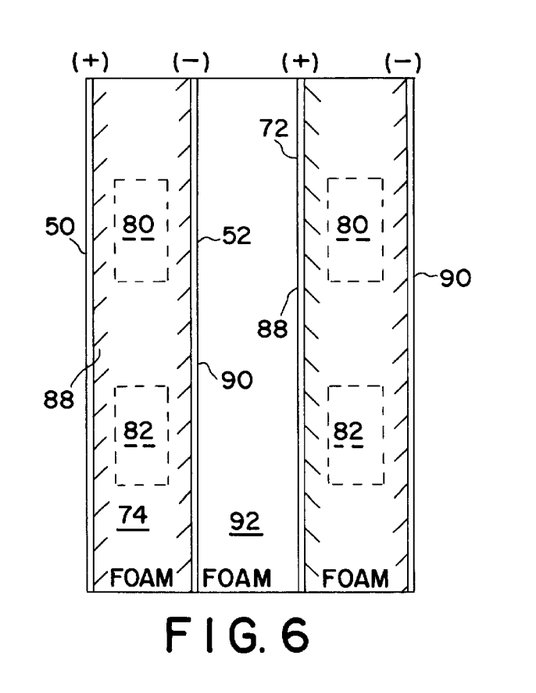
FIG. 6 schematically shows how particles collect in the foam as they are removed from the processed fluid.

The reason for this is that a corona 84 (FIG. 5) forms around the positive (+) plates. This corona has a force field acting in direction D1 (counter-clockwise). The magnets 80, 82 have a toroidal flux field 86 which interacts with the corona 84. As shown in FIG. 5, the toroidal flux field aids the corona at some places D2 and opposes it in other places D3 to cause a turbulence of the particles suspended in the fluid. If not confined within the straws 76 through the plastic foam pads 74, the particle in the fluid would be in constant motion more or less trapped in the resultant force field established by the interaction of the flux 86 and corona 84. The different effects at different locations in the force fields tend to create greater random agitation. However, since the particles are confined within the straws 76, this agitation causes them to become embedded within the foam at 88, 90 as shown in FIG. 6.

No magnets are present in the foam pad 92 located between plates 52, 72 in the negative (−) to positive (+) flow direction F2. No corona forms on the negative (−) plates at earth ground. Therefore, no particle entrapment is shown in foam pad 92.

Once the particle entrapment 88, 90 (FIG. 6) builds sufficiently, the filter housing part 22 is back-flushed, which washes away most of the particles embedded in the form. However, after enough time, it is no longer possible to clean the foam with a simple back-flushing. When this happens, the foam pads become very hard and stiff, are discarded, and are replaced by new foam pads.

To replace the foam in the filters shown in the earlier U.S. Pat. Nos. 5,149,422 and 5,242,587, a complete disassembly and cleaning is required, which is appropriate for such large scale filters, but which is not economically feasible with small filters. However, with the present design, it is possible to simply pull out and replace the plates and foam, as may be required.

Another advantage of the invention is that all parts are uniform for all systems. The filtering needs change with the additive package that is put into the hydrocarbon fluid. Hence, the needs change with almost every manufacturer of a fluid which is to be filtered. This means that most filters were designed to fit the particular users needs. In the earlier system, either the spacing between the positive (+) to negative (−) plates would be changed to match the additive or a less than maximum efficiency was accepted.

The filtering is directly proportional to current consumption within the filter stack. Therefore, with the present invention the current consumption is controlled by selecting the level of the voltage applied across the bars 26, 28. Hence, there is no need to change the spacing between the plates. It has been found that, for the hydrocarbon fluids of most interest, three voltages 5,000; 10,000; and 15,000 D.C. are best. Therefore, when changing the fluid to be filtered, one of these voltages is selected, usually based upon the additive package in the fluid to be filtered. If some other voltage is required, it is only necessary to replace the power pack housing part 24.

Figure 7:
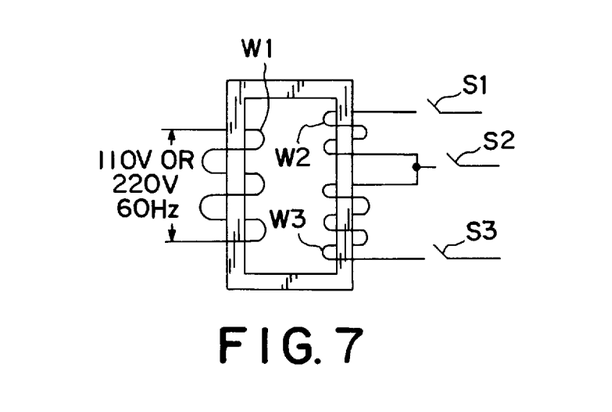
FIG. 7 shows a transformer for giving three, for example, separate voltages.

FIG. 7 shows a transformer arrangement for producing these three voltages. A suitable power source (such as the commercially available 110V or 220v 60 Hz source) is connected across primary winding W1. In effect, for 5,000 volts, switches S1 and S2 are closed to take an output voltage from secondary winding W2. For 10,000 volts, switches S2 and S3 are closed for taking an output voltage from secondary winding W3. When a full 15,000 volts is needed, switches S1, S3 are closed to take an output voltage from both secondary windings W2, W3.

Figure 8:
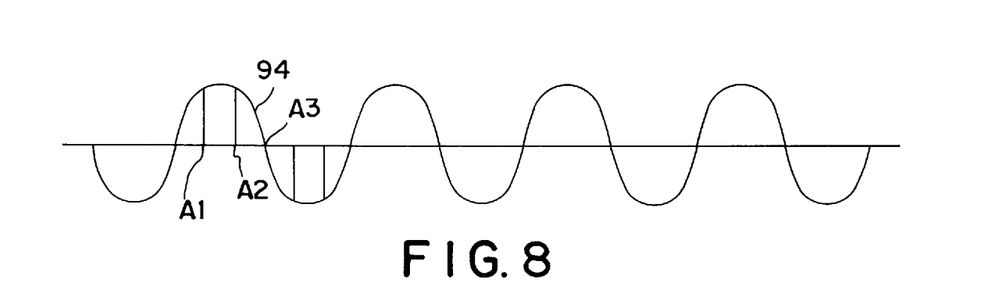
FIG. 8 graphically shows how any of three voltages may be produced by turning an electric switch off and on at selected phase angles of an AC wave form.
Figure 9:
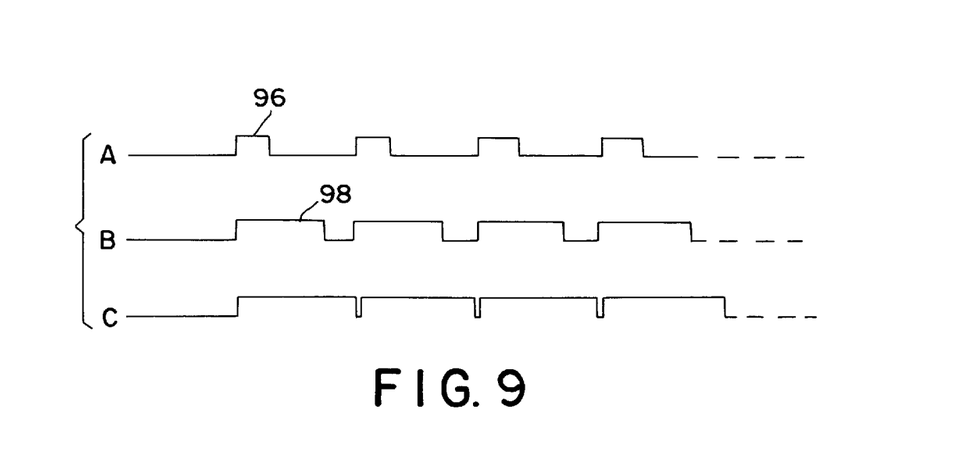
FIG. 9 shows the digital power output resulting from the phase angle selection of FIG. 8.

Another way of producing a selectable output is to use an electronic switch (such as an SCR), designed to fire on a selected phase angle in the commercially available sinusoidal wave form 94 (FIG. 8). If the SCR is set to fire at phase angle A1, a series of relatively narrow voltage pulses 96 (shown in FIG. 9A) is produced and integrated to provide 5,000 volts. If the SCR fires at phase angle A2, a series of wider voltage pulses 98 is produced, as shown at FIG. 9B, and integrated to provide 10,000 volts. If the SCR fires at phase angle A3, a series of still wider voltage pulse 100 are produced as shown in FIG. 9C, and integrated to provide 15,000 volts.

Regardless of how the voltage selection occurs, the current consumption may be controlled to thereby adapt the system to filter a specific fluid without having to change the physical construction of the filter.

Those who are skilled in the art will readily perceive how to modify the invention. Therefore, the appended claims are to be construed to cover all equivalent structures which fall within the true scope and spirit of the invention.

The claimed invention is:

1. An electrostatic filter for removing particles from non-electrically-conductive fluids, said filter comprising two filter housing parts which fit together, a pair of electrically conductive bars extending through one of said housing parts, means in the other of said housing parts for energizing said pair of conductive bars at a ground level and at a selected one of a plurality of D.C. voltage levels, a filter stack within said one housing part, said stack comprising a plurality of electrically conductive plates which can be selectively connected to either one but not simultaneously to both of said two bars, successive ones of said plates in said filter stack being connected to alternate ones of said two bars whereby said plates are alternatively positive and negative, filter means comprising a pad located between each of said plates in said filter stack, each of said plates and filter means having open areas which enable fluid to flow in at least a given direction through said one housing part and the stack therein, and permanent magnet means located in those of said filter means which are between pairs of said positive and negative conductive plates, determined with respect to said given direction of said fluid flow, but not between other pairs of said conductive plates which are negative to positive with respect to said given direction of said fluid flow.

2. The filter of claim 1 wherein said plurality of D.C. voltage levels are 5,000; 10,000; and 15,000 volts.

3. The filter of claim 1 wherein said selected D.C. voltage creates a corona around those of said electrically conductive plates which are at a positive voltage.

4. The filter of claim 3 wherein the locations of said permanent magnets relative to said positive voltage electrically conductive plates is such that a magnetic flux field of said permanent magnets interacts with said corona to cause a turbulent motion of said particles in said fluid.

5. The filter of claim 1 wherein each of said plates has substantially the same shape with a projection on one side for making contact with one of said bars, and said alternate positive and negative plate polarity is achieved by reversing said plates so that said projection is on an opposite side of said plates.

6. The filter of claim 1 further comprising means responsive to closing said one housing part for applying contact pressure between said electrostatic plates and said contact bars.

7. An electrostatic filter comprising a filter housing containing a filter stack having a plurality of identical electrostatic plates, a pair of D.C. conductive elements extending along said filter stack, means for mounting said plates in either of two orientations, each of said plates making contact with one of said conductive elements and having a corresponding D.C. polarity depending upon which of said two orientations said plate has in said stack, a filter pad located between each of said plates and its neighboring plates thereby forming said filter stack, said mounting means enabling said plates to be installed into and removed from said filter stack without requiring a complete disassembly of said filter stack, means responsive to closing said housing for applying a contact pressure between said electrostatic plates and said conductive element of said corresponding D.C. polarity, each of said plates and filter pads having an open area therein adequate for a fluid to flow through, means for agitating particles in said fluid so that they become embedded in said filter pads while in and moving through said open areas of said pads, and means for regulating a voltage difference between said D.C. conductive elements in order to control electrical current consumption in said filter.

8. The filter of claim 7 wherein said means for agitating said particles comprises means for energizing alternating ones of said electrostatic plates to a level which creates a corona in an area around said plate, and means for creating a magnetic field close enough to said corona to interact therewith.

9. The filter of claim 8 wherein said pair of D.C. conductive elements comprise a pair of spaced parallel bars extending through said filter stack, means for electrifying one of said bars to have one polarity at a selected one of a plurality of high voltages, means for holding the other of said bars at earth ground potential, each of said electrostatic plates having one side with a projecting configuration so that said individual plates make contact with either one of said bars depending upon whether said plate is inserted into said stack with the orientation of said plate having said projection positioned on one side or the other to contact one or the other of said bars.

10. The filter of any one of the claims 1–5 and 7–9 wherein each of said pads is a foam pad having microscopic pores therein forming straws which extend through said pad and which collectively form an open area for said fluid to flow therethrough, said particles moving with agitation while in said straws so as to be captured in the foam surrounding said straws.

11. The filter of either one of said claims 8 and 9 wherein said magnetic field creating means are at least one ceramic permanent magnet embedded in each of said pads located between said positive and negative plates relative to a direction of fluid flow within said housing.

12. The filter of claim 9 further comprising a second housing containing a power source for alternatively energizing said plates at said positive potential and said earth ground, respectively, and means for coupling said second housing to said filter housing.

13. The filter of claim 12 wherein said coupling of said second housing to said filter housing is an electrical coupling.

14. The filter of claim 12 wherein said coupling of said second housing to said filter housing is a mechanical coupling.

* * * * *